Patented Nov. 24, 1942

2,303,306

UNITED STATES PATENT OFFICE 2,303,306

PROCESS FOR THE MANUFACTURE OF TITANIUM DIOXIDE

Peter Tillmann, Cologne, Friedrich Raspe, Leverkusen-I. G. Werk, and Josef Heinen, Cologne, Germany, assignors to Titan Company, Inc., Wilmington, Del., a corporation of Delaware No Drawing. Application November 2, 1938, Serial No. 238,358. In Germany November 5, 1937

10 Claims. (Cl. 23—202)

This invention relates to a process for the manufacture of titanium dioxide by hydrolysis of a titanium salt solution in the presence of a hydrated titanium oxide sol and to a method of preparing such hydrated titanium oxide sol.

Attention is directed to copending applications Ser. No. 204,838, filed Apr. 28, 1938, to P. Tillmann and F. Raspe, drawn to hydrolyzing titanium salt solutions in the presence of a sol prepared solely by heat treatment or dialysis of a univalent anion Ti-solution, and Ser. No. 304,323 filed Nov. 14, 1939, by P. Tillmann and F. Raspe, filed Nov. 14, 1939, drawn to hydrolyzing titanium salt solutions in the presence of a sol formed by dilution and heat treatment of an univalent anion titanium solution diluted with hot water.

Many processes for the manufacture of titanium dioxide-pigments which consist in decomposing a titanium compound by heat hydrolysis are known. It is also known to influence this hydrolysis by the addition of any kind of nuclei in a desired direction. For this purpose titanium dioxide gel and colloidal titanium dioxide have been used as nuclei. These colloidal titanium dioxide sols are partly obtained by subjecting a titanium salt solution to careful heat treatment whereby sols are obtained by a condensation process. A great advance in the manufacture of titanium pigments was obtained by carrying out hydrolysis with the assistance of titanium sols with univalent anions which for developing the nucleating properties have been heated, for instance to a temperature above 70° C. A second possibility to manufacture titanium dioxide sols is the peptization of precipitated titanium hydrate. The pigments obtained with these latter titanium dioxide sols show a tinting strength which at the most is 10 to 12 times better than the tinting strength of the usual commercial white lead.

In accordance with the present invention it is possible to obtain excellent pigments with sols obtained by peptization which pigments show a tinting strength which is 18–19 times better than the tinting strength of the usual commercial white lead.

For this purpose it is necessary that the titanium hydrates used for peptization are practically free from polyvalent anions. Freeing of the titanium hydrates from the polyvalent anions is effected in the usual manner, for instance by neutralizing the titanium hydrate with neutralizing agents, such as for instance alkali metal hydroxides and carbonates or ammonia and its compounds. Since in this case water-soluble salts are formed the polyvalent anions can be removed by washing with water. According to another possibility to obtain a sol without polyvalent anions the treatment may be effected by adding to the titanium hydrate an agent yielding with the polyvalent anions present in the titanium hydrate water-insoluble compounds, for instance $Ba(OH)_2$, $BaCl_2$, $SrCO_3$ or other alkaline-earth metal compounds. Furthermore it is possible to eliminate the polyvalent anions present in the titanium hydrate, for instance the $SO_4$-ion by prolonged and repeated washing with water. After the titanium hydrate has been freed from the polyvalent anions the peptization of the $TiO_2$ is effected with monobasic acid agents, such as for instance hydrochloric acid, nitric acid, titanium tetrachloride. Sols the $TiO_2$-concentration of which does not exceed 50 grams of titanium dioxide per liter are particularly efficacious. As the lower limit practically not less than 5 grams of $TiO_2$ per liter should be taken. The quantity of nuclei necessary for hydrolyzing a given quantity of a titanium salt solution is preferably within the range of 8–20% calculated on the amount of $TiO_2$ present in the solution to be hydrolyzed.

If a titanium sulfate solution is used for preparing titanium dioxide it is advantageous to fix the proportion of $TiO_2$ to sulfuric acid bound to $TiO_2$ from 1:1 to about 1.8. Hydrolysis is advantageously carried out in such a manner that either the sol or the solution to be hydrolyzed or both are heated prior to hydrolysis and caused to react one upon the other.

If nitric acid is used as peptization agent for the manufacture of the sol, or other acids containing nitrogen and oxygen, it is important to keep the usual $Ti^{III}$ concentration which must be present for avoiding the oxidation of the iron in solutions obtained by decomposing ilmenite with sulfuric acid so high that it is sufficient to reduce the acid used for peptization of the nuclei quantitatively. This reduction is of considerable importance for avoiding corrosion of the apparatus.

The products obtained in this manner are of excellent whiteness and show a tinting strength which is far superior to the usual commercial products.

If the hydrolysis is carried out in the presence of extenders or fillers, such as $BaCO_3$, $BaSO_4$, silica, $CaSO_4$, composite pigments of excellent quality are obtained.

The invention is further illustrated by the following examples without being restricted thereto:

*Example 1.*—100 grams of titanium hydrate freshly precipitated from a titanium sulfate solution containing 35 grams of $TiO_2$ are suspended in 2 liters of water. The suspension thus obtained is neutralized with ammonia. By treating the suspension three times with 4 liters of water and subsequent filtration the main quantity of the ammonium sulfate is removed from the $TiO_2$. 100 ccs. of a 15% hydrochloric acid are added to the washed titanium hydrate. By dilution with water to a content of 19.2 g. per liter, a sol is obtained which is heated on the water-bath to 90–95° C. 500 ccs. of this hot sol are caused to flow into 500 ccs. of a titanium sulfate solution heated to 100° C. which has been obtained by decomposition of ilmenite with sulfuric acid. The titanium sulfate solution contains

| | Grams |
|---|---|
| $TiO_2$ | per liter 140 |
| $FeSO_4$ | do__ 180 |
| $H_2SO_4$ bound to $TiO_2$ | do__ 255 |
| $Ti^{III}$ | do__ 2.1 |

The whole mixture is heated and kept boiling for half an hour. The yield of $TiO_2$ obtained is between 96% and 98%. After the customary after-treatment and calcination a pigment is obtained which has a tinting strength of about 1700 according to the Reynold method.

*Example 2.*—100 grams of titanium hydrate paste according to Example 1 are neutralized with ammonia and heated with 300 ccs. of 10% hydrochloric acid for several hours to 80° C. After filtering the hydrochloric acid on the suction filter enough HCl is present in the $TiO_2$ to obtain a sol formation in the subsequent treatment with 1800 grams of water. 500 ccs. of this sol and 500 ccs. of the titanium sulfate solution used in this example according to the precipitation method indicated in Example 1 yield a pigment of the same high tinting strength.

*Example 3.*—100 g. of titanium hydrate paste according to Example 1 are suspended with 400 ccs. of 10% hydrochloric acid and heated to 80–85° C. for 5 hours. The solution is then filtered with suction and again heated to 85° C. with 400 ccs. of 10% hydrochloric acid for 5 hours. After filtering the hydrochloric acid with suction as indicated in the preceding examples a sol formation can be observed on diluting with 1800 grams of water. The sol together with the titanium sulfate solution indicated in Example 1 in the proportion 1:1 likewise yields pigments of high tinting strength.

*Example 4.*—Grams of titanium hydrate paste are neutralized and washed as indicated in Example 1 and treated with 23 ccs. of 15% $HNO_3$. The sol is brought with water to a content of 19.2 grams of $TiO_2$ per liter and heated on the water bath to 90–95° C. 500 ccs. of the titanium sulfate solution according to Example 1 are heated to boiling and 61 ccs. of a titanous sulfate solution containing 80 grams of $Ti^{III}$ per liter are added. 560 ccs. of the nucleating sol are added to the boiling solution which is heated and kept boiling for half an hour. The pigment obtained shows the same tinting strength as that indicated in the foregoing examples.

We claim:

1. Process for the hydrolytic decomposition of a hydrolyzable titanium salt solution which comprises precipitating titanium hydrate from a titanium salt solution, purifying the precipitated titanium hydrate, peptizing the purified titanium hydrate in water by means of a peptizing agent the negative ion of which is univalent and heating the resultant colloidal suspension until a stabilized, slightly opalescent, unfilterable sol is formed, the proportions of water hydrate and of the peptizing agent being such that the resulting sol will contain between about 5 grams to about 50 grams of titanium per litre calculated as $TiO_2$, admixing a sufficient amount of the resultant sol with a titanium salt solution to yield between about 8 percent and about 20 percent of the total titanium calculated as $TiO_2$ in the mixture and hydrolyzing that mixture.

2. Process for the hydrolytic decomposition of a hydrolyzable titanium salt solution which comprises precipitating titanium hydrate from a titanium salt solution, purifying the precipitated titanium hydrate by means of an alkaline reacting neutralization agent, peptizing the purified titanium hydrate in water by means of a peptizing agent the negative ion of which is univalent and heating the resultant colloidal suspension until a stabilized, slightly opalescent, unfilterable sol is formed, the proportions of water hydrate and of the peptizing agent being such that the resulting sol will contain between about 5 grams to about 50 grams of titanium per litre calculated as $TiO_2$, admixing a sufficient amount of the resultant sol with a titanium salt solution to yield between about 8 percent and about 20 percent of the total titanium calculated as $TiO_2$ in the mixture and hydrolyzing that mixture.

3. Process for the hydrolytic decomposition of a hydrolyzable titanium salt solution which comprises precipitating titanium hydrate from a titanium salt solution, purifying the precipitated titanium hydrate by neutralization with ammonia and removing the ammonium salt formed by washing, peptizing the purified titanium hydrate in water by means of a peptizing agent the negative ion of which is univalent and heating the resultant colloidal suspension until a stabilized, slightly opalescent, unfilterable sol is formed, the proportions of water, hydrate and of the peptizing agent being such that the resulting sol will contain between about 5 grams to about 50 grams of titanium per litre calculated as $TiO_2$, admixing a sufficient amount of the resultant sol with a titanium salt solution to yield between about 8 percent and about 20 percent of the total titanium calculated as $TiO_2$ in the mixture and hydrolyzing that mixture.

4. Process for the hydrolytic decomposition of a hydrolyzable titanium salt solution which comprises precipitating titanium hydrate from a titanium sulfate solution, peptizing the titanium hydrate in water by means of an alkaline earth metal compound the negative ion of which is univalent and heating the resultant colloidal suspension until a stabilized, slightly opalescent, unfilterable sol is formed, the proportions of water hydrate and of the peptizing agent being such that the resulting sol will contain between about 5 grams to about 50 grams of titanium per litre calculated as $TiO_2$, admixing a sufficient amount of the resultant sol with a titanium salt solution to yield between about 8 percent and about 20 percent of the total titanium calculated as $TiO_2$ in the mixture and hydrolyzing that mixture.

5. Process for the hydrolytic decomposition of a hydrolyzable titanium salt solution which comprises precipitating titanium hydrate from a titanium salt solution, purifying the precipitated titanium hydrate, peptizing the purified titanium hydrate in water by means of a mono-basic acid agent and heating the resultant colloidal suspension until a stabilized, slightly opalescent, unfilterable sol is formed, the proportions of water, hydrate and of the peptizing agent being such that the resulting sol will contain between about 5 grams to about 50 grams of titanium per litre calculated as $TiO_2$, admixing a sufficient amount of the resultant sol with a titanium salt solution to yield between about 8 percent and about 20 percent of the total titanium calculated as $TiO_2$ in the mixture and hydrolyzing that mixture.

6. Process for the hydrolytic decomposition of a hydrolyzable titanium salt solution which comprises precipitating titanium hydrate from a titanium salt solution, purifying the precipitated titanium hydrate, peptizing the purified titanium hydrate in water by means of titanium tetrachloride and heating the resultant colloidal suspension until a stabilized, slightly opalescent, unfilterable sol is formed, the proportions of water, hydrate and of the peptizing agent being such that the resulting sol will contain between about 5 grams to about 50 grams of titanium per litre calculated as $TiO_2$, admixing a sufficient amount of the resultant sol with a titanium salt solution to yield between about 8 percent and about 20 percent of the total titanium calculated as $TiO_2$ in the mixture and hydrolyzing that mixture.

7. Process for the hydrolytic decomposition of a hydrolyzable titanium salt solution which comprises precipitating titanium hydrate from a titanium salt solution, purifying the precipitated titanium hydrate, peptizing the purified titanium hydrate in water by means of a monobasic acid and heating the resultant colloidal suspension until a stabilized, slightly opalescent, unfilterable sol is formed, the proportions of water, hydrate and of the peptizing agent being such that the resulting sol will contain between about 5 grams to about 50 grams of titanium per litre calculated as $TiO_2$, admixing a sufficient amount of the resultant sol with a titanium salt solution to yield between about 8 percent and about 20 percent of the total titanium calculated as $TiO_2$ in the mixture and hydrolyzing that mixture.

8. Process for the hydrolytic decomposition of a hydrolyzable titanium salt solution which comprises precipitating titanium hydrate from a titanium salt solution, purifying the precipitated titanium hydrate, peptizing the purified titanium hydrate in water by means of nitric acid and heating the resultant colloidal suspension until a stabilized, slightly opalescent, unfilterable sol is formed, the proportions of water, hydrate and of the peptizing agent being such that the resulting sol will contain between about 5 grams to about 50 grams of titanium per litre calculated as $TiO_2$, admixing a sufficient amount of the resultant sol with a titanium salt solution to yield between about 8 percent and about 20 percent of the total titanium calculated as $TiO_2$ in the mixture and hydrolyzing that mixture.

9. Process for the hydrolytic decomposition of a hydrolyzable titanium salt solution which comprises precipitating titanium hydrate from a titanium salt solution, purifying the precipitated titanium hydrate, peptizing the purified titanium hydrate in water by means of nitric acid and heating the resultant colloidal suspension until a stabilized, slightly opalescent, unfilterable sol is formed the proportions of water, hydrate and of the peptizing agent being such that the resulting sol will contain between about 5 grams to about 50 grams of titanium per litre calculated as $TiO_2$, admixing a sufficient amount of the resultant sol with a titanium salt solution to yield between about 8 percent and about 20 percent of the total titanium calculated as $TiO_2$ in the mixture and hydrolyzing that mixture, said hydrolyzable titanium salt solution containing an amount of $Ti^{III}$ at least sufficient for the reduction of the nitric acid.

10. Process for the hydrolytic decomposition of a hydrolyzable titanium salt solution which comprises precipitating titanium hydrate from a titanium salt solution, purifying the precipitated titanium hydrate, peptizing the purified titanium hydrate in water by means of hydrochloric acid and heating the resultant colloidal suspension until a stabilized, slightly opalescent, unfilterable sol is formed, the proportions of water, hydrate and of the peptizing agent being such that the resulting sol will contain between about 5 grams to about 50 grams of titanium per litre calculated as $TiO_2$, admixing a sufficient amount of the resultant sol with a titanium salt solution to yield the total titanium calculated as $TiO_2$ in the mixture and hydrolyzing that mixture.

PETER TILLMANN.
FRIEDRICH RASPE.
JOSEF HEINEN.